(12) United States Patent
Falconer et al.

(10) Patent No.: US 8,403,585 B2
(45) Date of Patent: Mar. 26, 2013

(54) MITER JOINT BRACKET AND METHOD OF USING

(76) Inventors: Ralph Anthony Falconer, Rio Rancho, NM (US); Scott Allen Falconer, Salinas, CA (US)

( * ) Notice: Subject to any disclaimer, the term of this patent is extended or adjusted under 35 U.S.C. 154(b) by 0 days.

(21) Appl. No.: 13/134,668

(22) Filed: Jun. 13, 2011

(65) Prior Publication Data

US 2012/0311847 A1    Dec. 13, 2012

(51) Int. Cl.
*F16B 1/00*         (2006.01)

(52) U.S. Cl. ........ 403/205; 403/295; 403/382; 403/402; 403/403

(58) Field of Classification Search .................. 403/205, 403/292, 295, 382, 401–403
See application file for complete search history.

(56) References Cited

U.S. PATENT DOCUMENTS

| | | | |
|---|---|---|---|
| 241,943 A | 5/1881 | Dockstader | |
| 891,604 A | 6/1908 | Diamond | |
| 899,556 A * | 9/1908 | Parker | 40/784 |
| 1,064,450 A | 6/1913 | Davison | |
| 1,729,586 A * | 9/1929 | Liebman | 403/295 |
| 1,957,362 A * | 5/1934 | Smith | 182/224 |
| 2,010,660 A * | 8/1935 | Ferris | 403/401 |
| 2,168,911 A * | 8/1939 | Meyer | 403/205 |
| 2,938,759 A * | 5/1960 | Rudow et al. | 248/188 |
| 2,947,391 A | 8/1960 | Wayne | |
| 3,818,672 A * | 6/1974 | Moore, Sr. | 403/295 |
| 4,068,967 A | 1/1978 | Hoodis | |
| 4,403,434 A | 9/1983 | Jenkins | |
| 4,477,990 A * | 10/1984 | Buchanan | 40/784 |
| 4,516,341 A | 5/1985 | Jenkins | |
| 4,547,986 A * | 10/1985 | Sherman | 40/785 |
| 4,549,711 A * | 10/1985 | Giltnane | 248/188 |
| 5,524,397 A * | 6/1996 | Byers et al. | 52/92.2 |
| 5,575,023 A * | 11/1996 | McCumber | 5/9.1 |
| 6,318,943 B2 | 11/2001 | Joyce | |
| 6,511,251 B2 * | 1/2003 | Bowell | 403/231 |
| 6,547,196 B2 * | 4/2003 | Binnebose et al. | 248/188 |
| 6,776,380 B1 * | 8/2004 | Kirk et al. | 248/188 |
| 7,422,185 B2 * | 9/2008 | Curnow et al. | 248/345.1 |
| D612,718 S * | 3/2010 | Lavelle | D8/403 |
| D624,812 S * | 10/2010 | Lavelle | D8/403 |
| D656,007 S * | 3/2012 | Swoish et al. | D8/403 |
| 2002/0159832 A1 * | 10/2002 | Bowell | 403/403 |
| 2012/0017513 A1 * | 1/2012 | Lehmann et al. | 49/381 |

* cited by examiner

*Primary Examiner* — Victor MacArthur (57) ABSTRACT

A miter joint bracket and method of using comprised of a base-plate having an oblate-hexagonal shape, a flat-roofed dome rising vertically from the base-plate, apertures drilled into the dome's flat roof to accommodate fasteners drilled or nailed through the apertures and into both sides of the miter joint of the frame to which the bracket is attached. The upper edges of the miter joint are drawn up into the space underneath the dome which pulls the upper edges slightly apart but forces the lower edges of the miter joint closer together thereby creating a tighter and more aesthetically appealing joint on the view-side of the shutter or frame to which the bracket is attached.

9 Claims, 14 Drawing Sheets

MITER JOINT BRACKET AND METHOD OF USING

FEDERALLY SPONSORED RESEARCH

Not Applicable

SEQUENCE LISTING OR PROGRAM

Not Applicable

Field of the Invention

The present invention relates generally to the field of brackets for connecting and securing the side sections of rectangular frames such as picture frames and window shutter frames. More particularly, the present invention relates to the field of brackets for connecting and securing the side sections of rectangular frames such as picture frames and window shutter frames having mitered joints on the corners of the rectangular frames.

BACKGROUND OF THE INVENTION

Description of the Prior Art

The prior art and building construction professionals recognize the long-standing problems in firmly securing the corners of window shutters, window or door frames, window or door screens, and other such rectangular-frame structures having miter joints at the corners. While the miter joint presents an aesthetically appealing configuration for joining adjacent sides of a window, door, or picture frame, firmly joining and securing those adjacent sides to one another requires either: (1) driving a fastener such as a nail or screw through both adjacent sides so as to traverse the miter joint inside the frame; or (2) affixing a bracket to the frame so that such bracket straddles the miter joint. Given the possibility of splitting the frame by using method (1), the preferred method of joining adjacent members of a miter-jointed frame is the second option.

Accordingly, the prior art provides an extensive list of devices designed to solve this problem with respect to window frames or door frames. Examples of such configurations include U.S. Pat. No. 891,604 issued to Diamond (1908) which discloses a frame for securing the corners of door and window screens, U.S. Pat. No. 2,010,660 issued to Ferris (1934) which discloses a corner brace plate for securing the corners of a window screen, U.S. Pat. No. 3,818,672 issued to Moore, Sr. (1974) which discloses a gusset for fasting the corners of hollow frame doors so as to prevent opening of the miter joint, and U.S. Pat. No. 4,068,967 issued to Hoodis (1978) which discloses a corner bracket for frames having opposing tabs that are perpendicular to the base plate of the bracket.

These devices were typically L-shaped plates that would not only have to straddle the miter joint; they would also have to be aligned along the edges of the frames to which they were attached at either the inside or outside corner of the frame. As such, the user was limited as to where the bracket could be placed on the frame. The device disclosed by Moore, Sr. was triangular in shape and designed for alignment and placement at the outer corner of the frame to which it was attached. However, in addition to being limited in placement to the outside corner of the frame, this device, because of its triangular shape, tended to be quite heavy, bulky, and cumbersome. These devices would then be screwed or nailed onto the frames with the fasteners going into the frame on opposite sides of the miter joint. These devices (with the exception of the device disclosed by Hoodis) typically did not have flaps or tabs extending downward from the bracket to provide additional firmness to the frame to prevent it from wobbling.

The prior art also contains several examples of devices that are used to stabilize or strengthen other items. Examples of such configurations include U.S. Pat. No. 241,943 issued to Dockstader (1881) which discloses a bracket-frame used to secure the corners of a pool table, U.S. Pat. No. 1,064,459 issued to Davison (1913) which discloses corner pieces for securing the corners of a picture frame, U.S. Pat. No. 2,947,391 issued to Wayne (1958) which discloses a corner connection for picture frames, U.S. Pat. Nos. 4,403,434 and 4,516,341 both issued to Jenkins (1983 and 1985) which disclose a picture frame assembly having an L-shaped corner plate with cam operating buttons to tighten the frame. These devices were similar in design, shape, and operation to the devices described earlier; their function, however, was to secure adjacent sides of miter-jointed structures other than window frames, door frames, and/or window shutters. Finally, U.S. Pat. No. 6,318,943 issued to Joyce (2001) which discloses a V-Type nail that is nailed into both sides of a miter-jointed corner.

Figure 1:
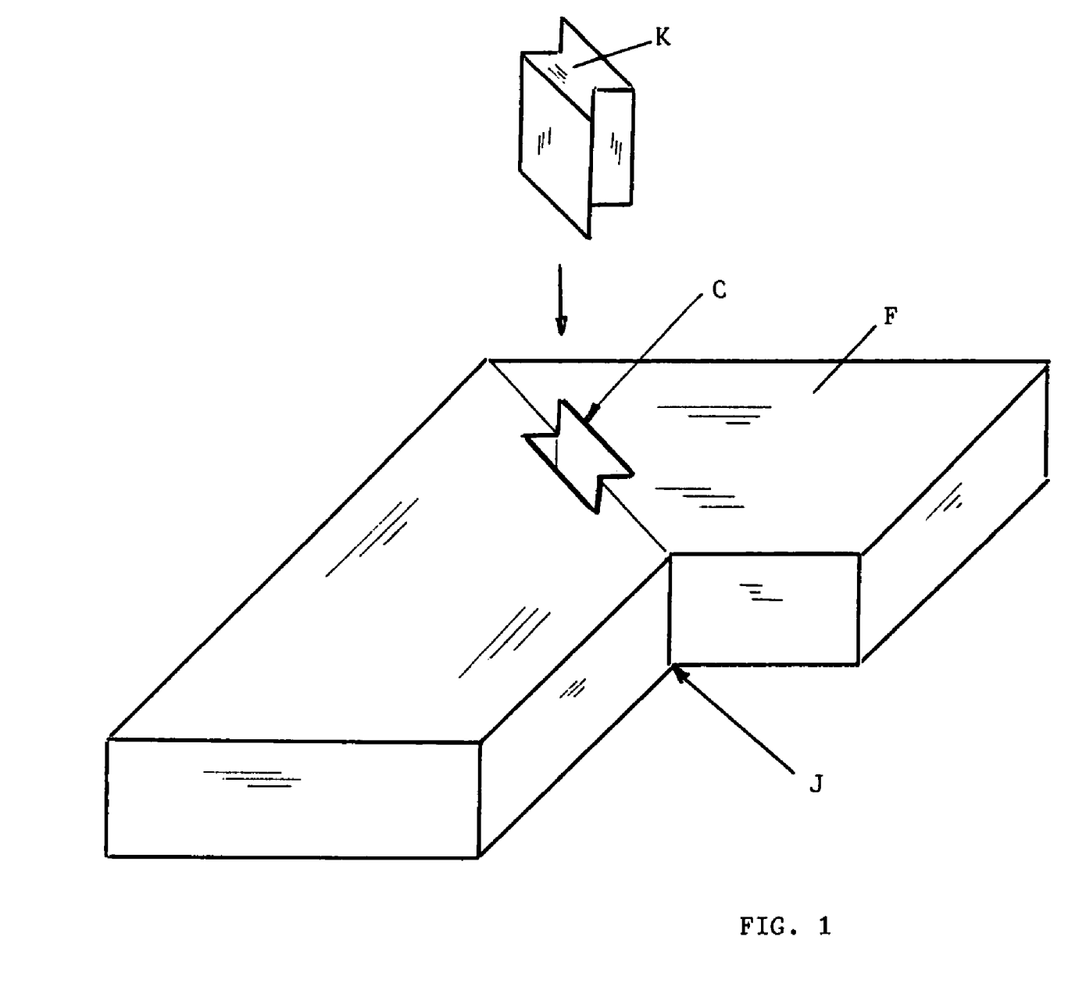
FIG. 1 is a perspective view of a generic frame connected by a Hoffman Key.

With respect to window frames and window shutters, the current construction industry standard method of securing the corners of a window shutter or a window frame F having a miter joint J at its corners is the Hoffman Key K, a depiction of which is shown in FIG. 1. The Hoffman Key K is typically an hour-glass shaped plastic plug that is inserted into an hour-glass shaped cavity C of essentially the same dimensions as the Hoffman Key K and straddling the miter joint J. While the Hoffman Key K suffices to connect adjacent sides of the frame F or shutters, the connection is not as tight or secure as one provided by brackets. Consequently, the frame F or shutters will eventually begin to wobble and become increasingly unstable over time. However, because the Hoffman Key K is inserted into a cavity C in the frame F or shutter, its ends are typically flush with the surface of the frame K or shutter which is more attractive to the eye.

While these prior art devices solved the problem of connecting two adjacent rectangular sides of a frame having a miter joint, they also had numerous shortcomings. The fact that these devices, with the notable exception of the Hoffman Key, are not in widespread use suggests that they did not solve the connection problem to the satisfaction of the general consuming public or that they were in some way unacceptable to the general consuming public. Many were bulky, unwieldy, and cumbersome. Many were unsightly or required too much metal to fabricate the bracket making them expensive to manufacture and again, bulky, unwieldy, and/or cumbersome. Many did not have side flanges to hold the frame in place. Because of their L-shaped or triangular shapes, most, if not all, had to be positioned at the inner or outer corner of the frame to which they were attached which severely limited the design options available to the user. Some had numerous moving parts making them expensive to manufacture and, in many cases, difficult to operate. In sum, the devices disclosed by the prior art suffer numerous shortcomings and disadvantages both individually and collectively:

(1) Many of the devices disclosed by the prior art are bulky and cumbersome which makes them difficult to install and unpleasant to look at.

(2) Many of the devices disclosed by the prior art are complex in their configuration which makes them difficult and expensive to manufacture, difficult to install, and unpleasant to look at.

(3) Many of the devices disclosed by the prior art are have moving parts which eventually loosen and require retightening. Such devices also tend to require specially machined parts which makes them more expensive to manufacture.

(4) Many of the devices disclosed by the prior art cannot or do not prevent the frame to which they are attached from wobbling and, in extreme cases, breaking apart.

(5) Most, if not all, of the devices disclosed by the prior art lie flat against the frames to which they are attached which limits the degree to which the frame members can be tightened against one another.

(6) Most, if not all of the devices disclosed by the prior art requires alignment and placement at the outer or inner corner and along the edge of the frame to which they were attached.

Objects and Advantages

The present invention seeks to overcome all of these shortcomings with a single device by providing an improved miter-joint bracket that is simple in design, easy and inexpensive to manufacture, flexible in its installation, and of durable construction, while still meeting the stated needs of the consumer for a reasonably priced construction item. Accordingly, the objects and advantages of the present invention are:

(1) to provide a miter joint bracket that will overcome the shortcoming of the prior art devices.

(2) to provide a miter joint bracket that is simple to manufacture, economical in price and easy to use.

(3) to provide a miter joint bracket that has no moving parts.

(4) to provide a miter joint bracket that is simple in design, easy and inexpensive to manufacture, easy and safe to use, and commercially reasonable in price.

(5) to provide a miter joint bracket that stabilizes the frame to which it is attached so as to prevent the frame from wobbling or breaking apart.

(6) to provide a miter joint bracket that further tightens the edges of the miter joint against one another and thereby providing the user with a more solid, stable, and unmovable finished frame.

Additional objects, advantages, and novel features of the invention will be set forth in part of the description which follows and will become apparent to those skilled in the art upon examination of the following specification, or will be learned through the practice of the present invention.

DRAWINGS

Drawing Figures

REFERENCE NUMERALS

10—Bracket
11—Base-plate
111—Bottom side
112—Top side
113—Lower leg
114—Upper leg
12—Dome
121—Dome roof
122—Dome side
123—Aperture
13—Side Flange
14—Fastener Reference Characters (Not Part of the Claimed Invention)

C—Cavity
F—Frame
G—Gap in the Miter Joint
J—Miter Joint
K—Hoffman Key (prior art)

DESCRIPTION OF THE INVENTION

Description—Simplest Embodiment

As mentioned previously, the current industry standard method of securing the corners of a window shutter or a window frame having a miter joint at its corners is the Hoffman Key K which is shown in FIG. 1. The Hoffman Key K is essentially a solid plastic plug shaped like a flat-sided hourglass that is pounded into a cavity C of essentially the same dimensions as the Hoffman Key K and straddling the miter joint J on the frame F. As also mentioned previously, the Hoffman Key K suffices to connect adjacent sides of the frame F or shutters but the connection is not as tight or secure as one provided by brackets. Consequently, the frame F or shutters will eventually begin to wobble and become increasingly unstable over time, especially when the frame is exposed to large variations in temperature and moisture.

Figure 2:
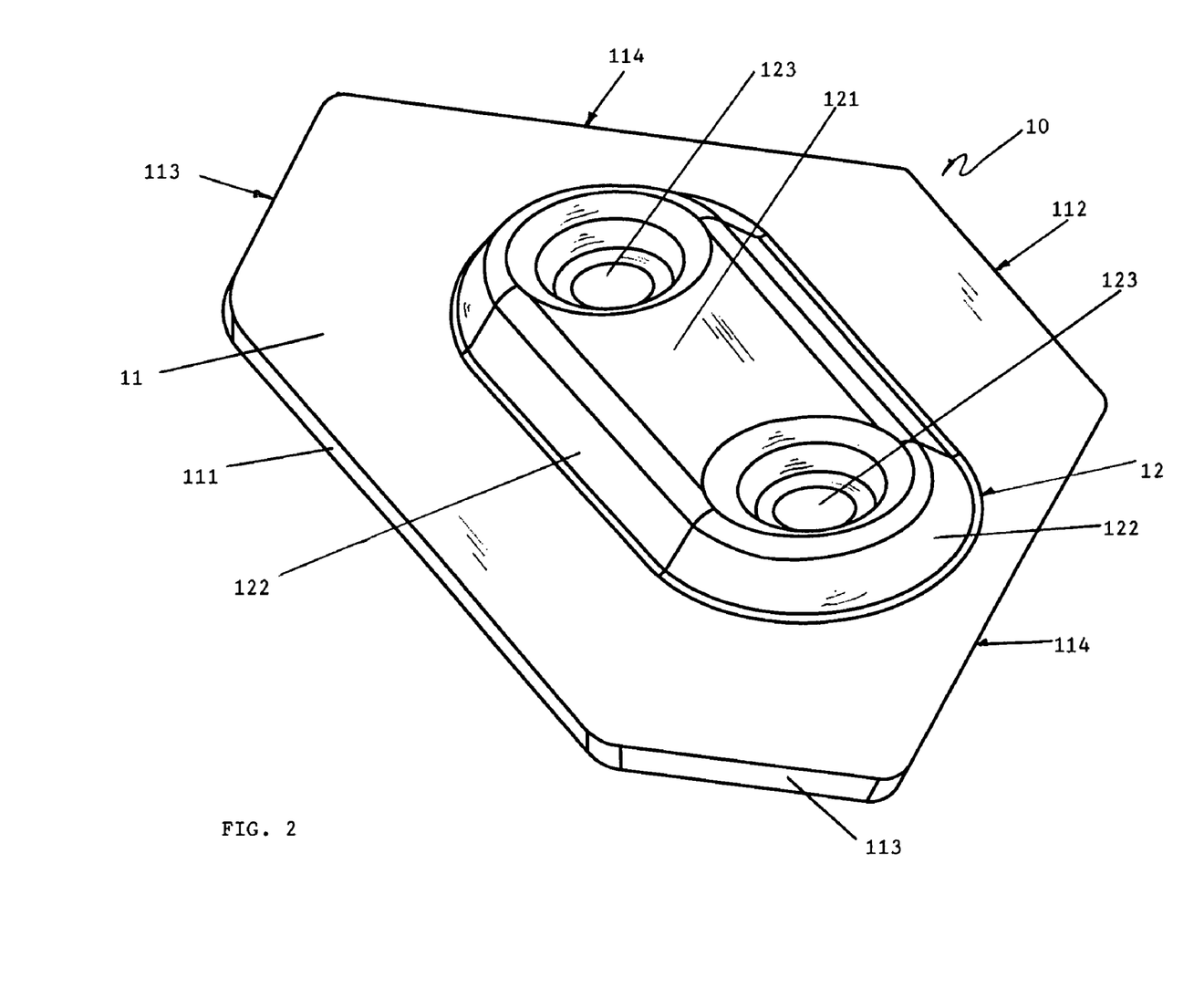
FIG. 2 is a downward-looking rear perspective of the simplest embodiment of the present invention.

FIG. 2 shows a downward-looking rear perspective of the simplest embodiment of present invention. The bracket 10 is an oblate hexagonal base plate 11 having a hole in its center and a truncated hollow dome 12 centered upon the base plate 11 and rising from the edge(s) of the hole in the base plate 11 so as to create a bubble-type cover over the hole in the base plate 11. The embodiment shown in FIG. 3 has, in addition to the base plate 11 and the dome 12, one side-flange 13 extending downward and at right angles to the base plate 11 while the embodiment shown in FIG. 3A, which is the preferred embodiment, has two side-flanges 13 extending downward and at right angles to the base plate 11.

Figure 2A:
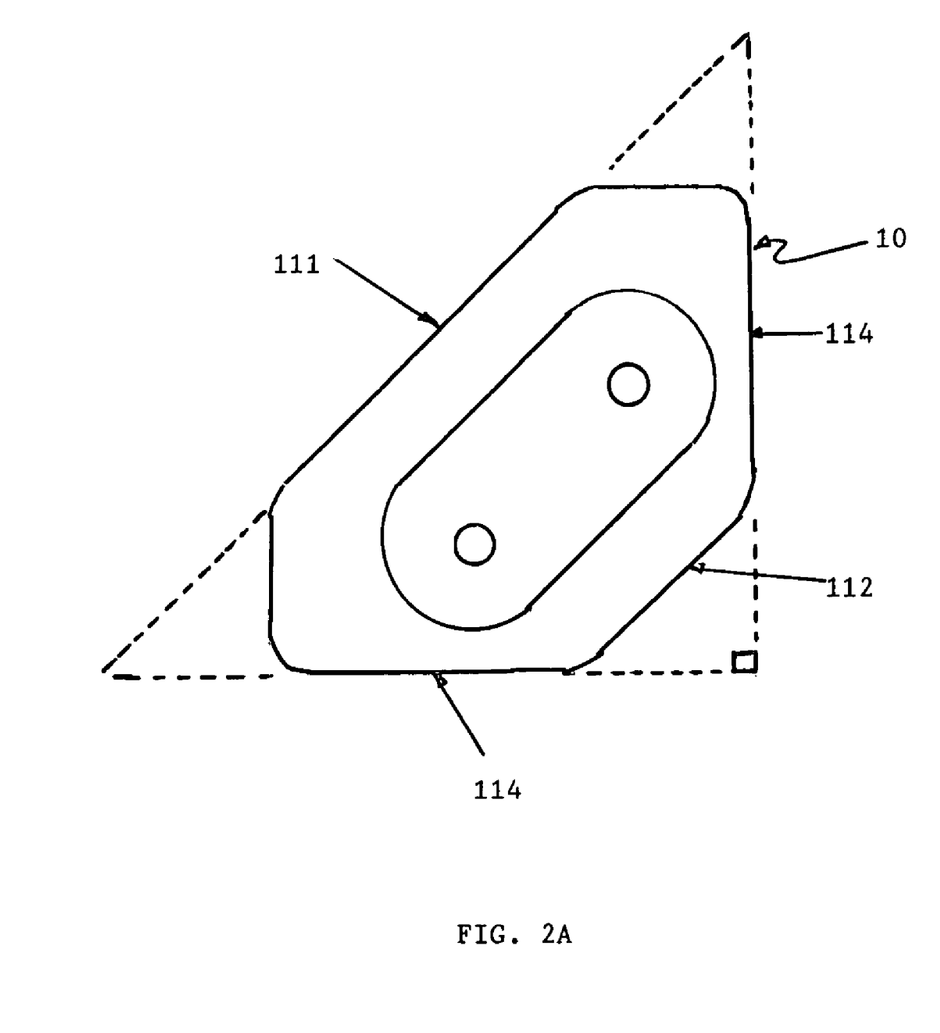
FIG. 2A is a plan view of the present invention giving a geometric representation of how the sides of the base-plate relate to one another.

Referring back to FIG. 2, the base plate 11 is typically a uniformly cast, pressed, or extruded metal or hard plastic structure or piece shaped like an equilateral triangle that has had each of its corners sheared off or truncated thereby giving the base-plate 11 its oblate hexagonal shape. The base plate 11 has a bottom side 111 (which would have been the hypotenuse of the sheared equilateral triangle), a shorter top side 112 that is parallel to the bottom side 111, two lower legs 113 of equal length extending outwardly at an obtuse angle from the bottom side 111, two upper legs 114 of equal length (which would have been the legs of the sheared equilateral triangle) each at an acute angle to its adjacent lower leg 113 and directed towards each other so that the upper legs 114, if extended beyond the top side 112, would intersect at a right angle, and if extended beyond their respective adjacent lower legs 113, would intersect an extended bottom side 111 at a forty-five degree angle. FIG. 2A shows a geometric representation of the foregoing description.

While the obtuse angle at which the lower legs 113 intersect the bottom side 112 may vary, the upper legs 114, if extended, will always intersect at a right angle which is necessary to properly align and square the bracket 10 onto the frame it is mounted upon. While the angle at which the upper legs 114 intersect the lower legs 113 may vary, aesthetics and functionality suggest that they intersect at a ninety degree angle.

Figure 7:
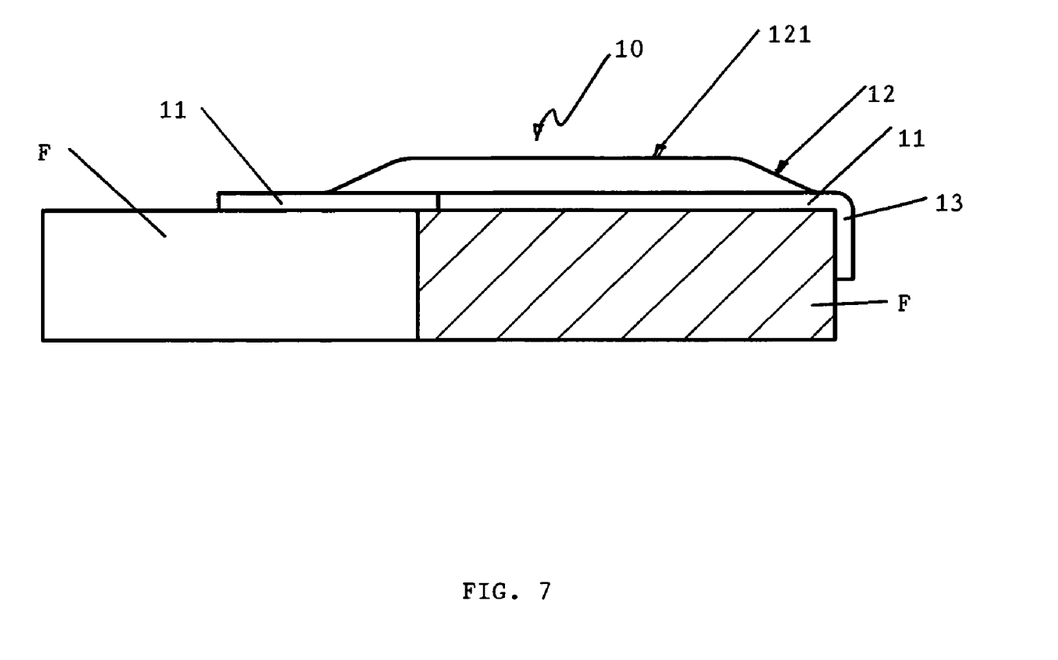
FIG. 7 is cross-sectional view A-A' of the present invention with a side-flap extending downward on one side and mounted on a generic frame.
Figure 8:
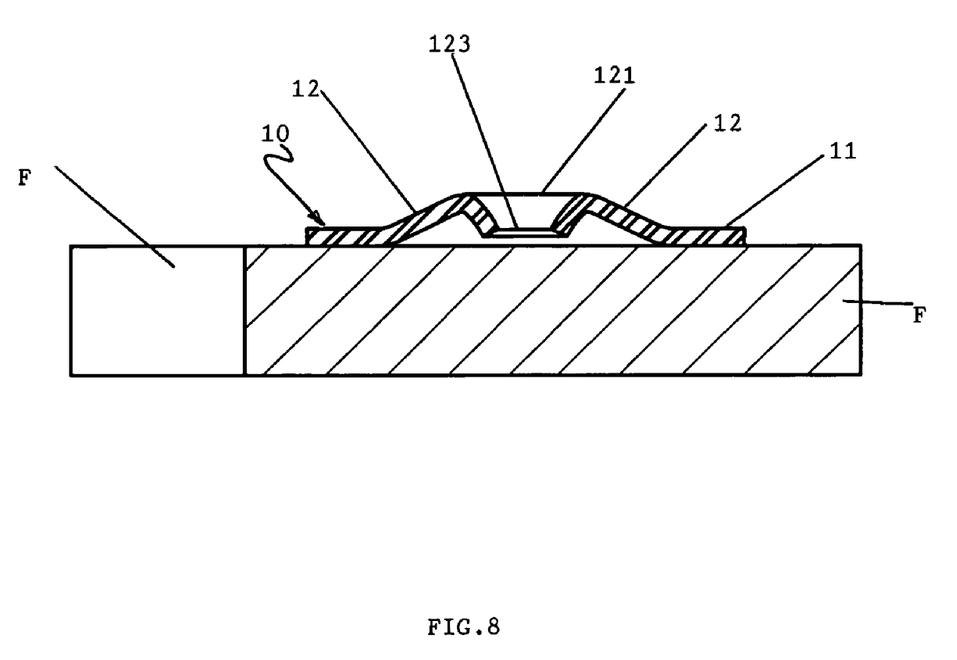
FIG. 8 is a cross-sectional view B-B' of the present invention mounted on a generic frame.
Figure 9:
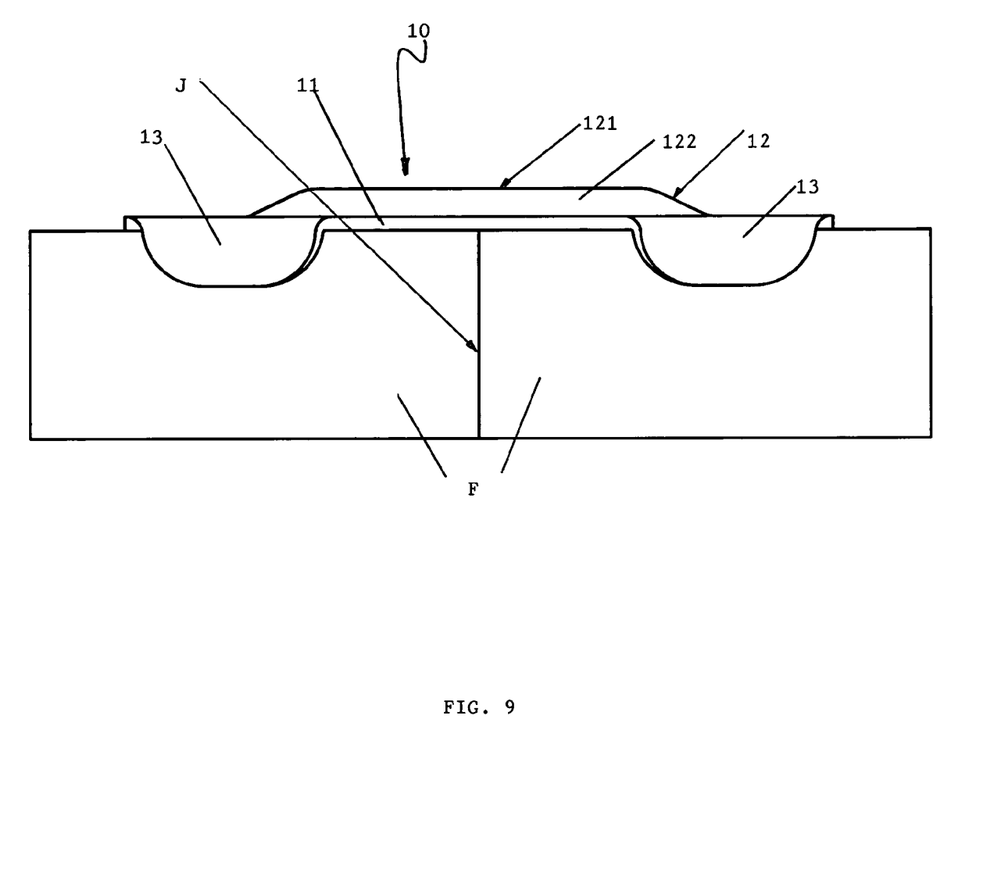
FIG. 9 is an end-on elevation view of the present invention with side-flaps extending downward on both sides and mounted on a generic frame.
Figure 10:
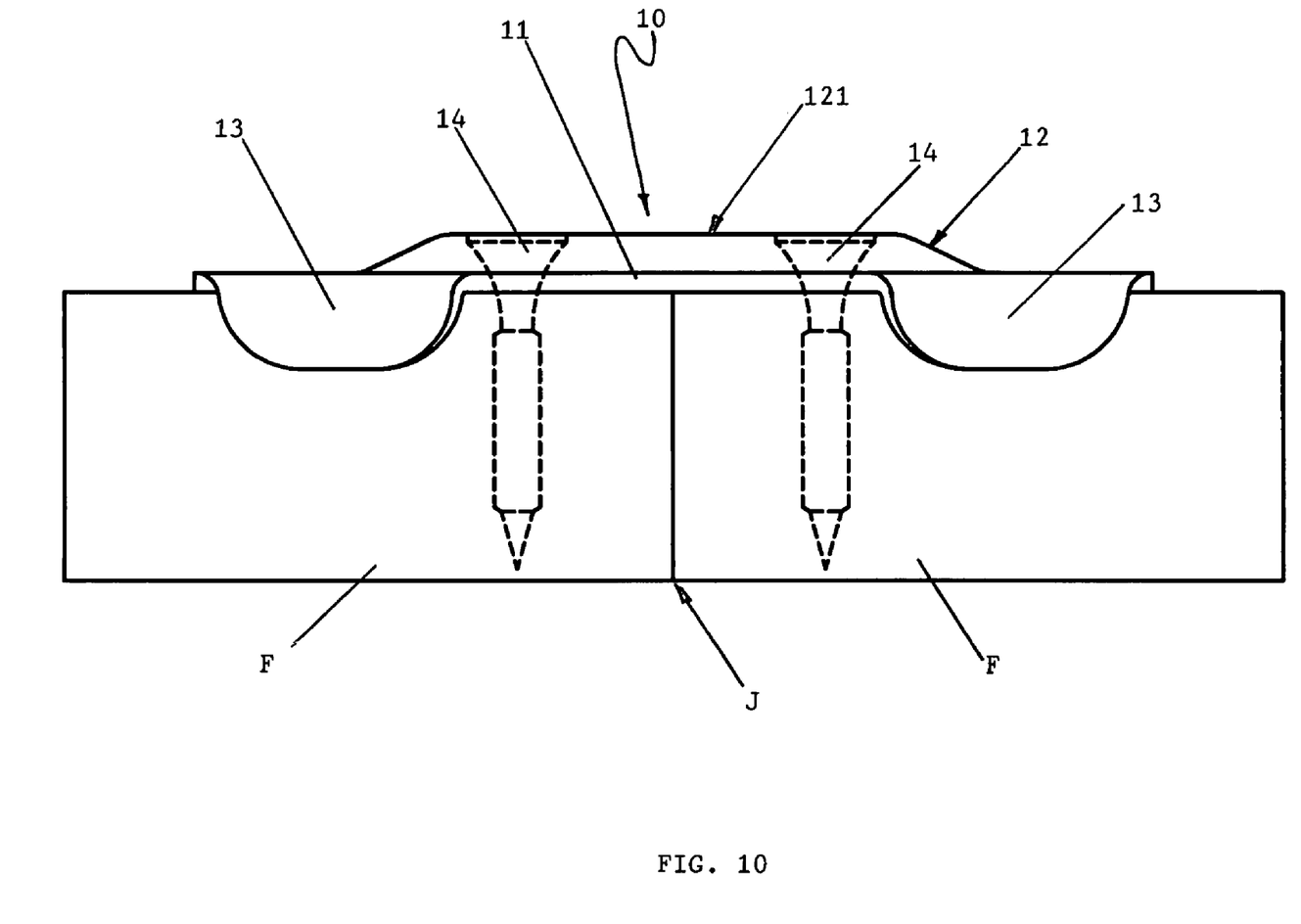
FIG. 10 is an end-on elevation view of the present invention with side-flaps extending downward on both sides and mounted on a generic frame with screws.

Referring to FIGS. 2, 3, 3A, 4, 4A, and 5-9, the dome 12 typically has the general shape of a four-sided, truncated rectangular pyramid that is hollow inside. The dome 12 has a generally flat upper surface or dome roof 121 that is generally parallel to the base-plate 11. Other embodiments contemplate a dome 12 having the shape of a hollow rectangular box, a hollow truncated cone, a hollow truncated sphere, or any other such hollow truncated three dimensional figures having a generally flat dome roof 121 that is parallel to the base plate 11. The dome 12 has one or more dome sides 122 extending upwardly from the edge(s) of the hole in the base plate 11 so as to intersect the dome roof 121 and thereby create a hollow space or cavity directly under the flat dome roof 121 while covering the hole in the base plate 11. This bubble-like cavity created by the dome 12 is best seen in FIG. 8.

Referring to FIGS. 2, 3, 3A, 5, 8, 10, and 11 two apertures 123 are drilled through the dome roof 121 so that fasteners 14 such as nails or screws inserted through the apertures 123 would enter the frame F to which the bracket 10 is attached on both sides of the miter joint J and equidistant therefrom. The apertures 123 are positioned so that an imaginary line connecting them would be parallel to the bottom side 111 and the top side 112 of the base plate 11. For aesthetic purposes, the dome roof 121 may be depressed or counter-sunk to accommodate the apertures 123 so that the flat top of the fastener 14 is flush with the surface of the dome roof 121.

The raised dome 12 with its hollow space or cavity directly under the flat dome roof 121 readily distinguishes the present invention from other brackets disclosed by the prior art. It also represents a significant improvement over brackets taught by the prior art because, as will be seen in the discussion of the operation of the present invention, the edges of the miter joint J are drawn up and into the cavity under the dome roof 121 which creates a tighter, more secure joint J.

Figure 11:
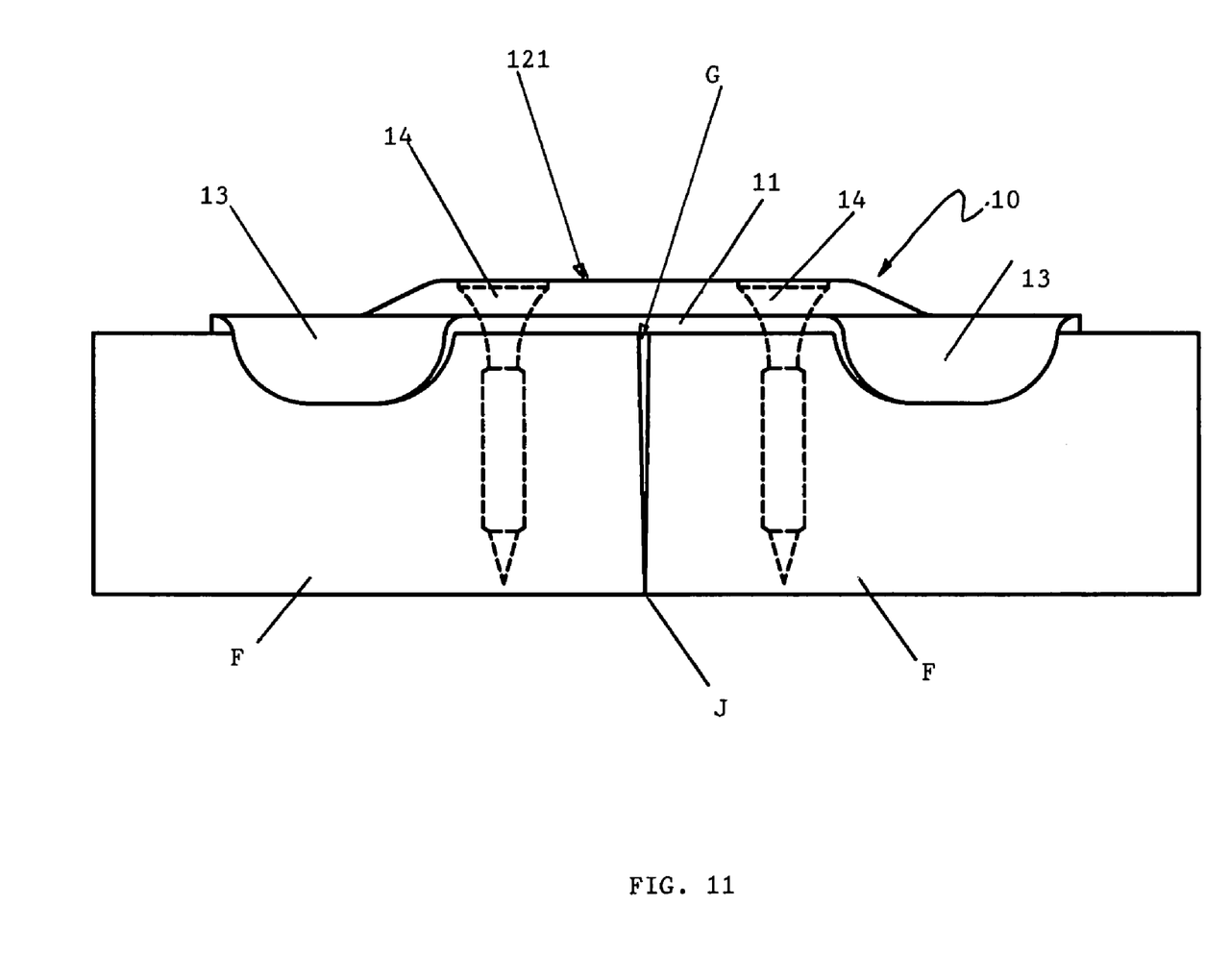
FIG. 11 is an end-on elevation view of the present invention with side-flaps extending downward on both sides, mounted on a generic frame with screws, and showing how the frame compresses at the bottom and opens at the top.

Specifically, when screws are used as fasteners 14 in the devices taught by the prior art and the present invention, the screwing action of the (screw) fasteners 14 draws the frame F to which the bracket 10 is attached upward so that the upper surface of the frame F is flush against the underside of the bracket 10. At the same time, the screwing action of the (screw) fastener 14 tends to press the lower edges of the miter joint J together. Because the underside of the devices taught by the prior art are flat, the upper edges of the miter joint J will necessarily be flush against the bottom side of the bracket 10; in essence, the flat, solid undersides of the prior art brackets 10 prevent the frame F from being drawn upward any further than to the underside bracket 10 itself. However, the present invention has a raised dome 12 with a hollow space or cavity directly underneath the dome roof 121 which permits the user to draw the upper edges of the frame F just a little further upward. As seen in FIG. 11, the action of the (screw) fastener 14 will draw the upper edges of the miter joint J into the cavity beneath the dome roof 121 causing them to split slightly apart which creates a small gap G between those upper edges. Conversely, and at the same time, the action of the (screw) fasteners 14 will press the lower edges of the miter joint J closer together for a tighter and more attractive joint J on the other side of the frame F.

The base plate 11 and the dome 12 are typically comprised of a lightweight metal or durable plastic and uniformly cast as one piece, which is the most practical and economic way of manufacturing the bracket 10. Alternatively, the dome 12 can be stamped or pressed out of a uniformly cast base plate 11. As yet another alternative, the base plate 11 and dome 12 may also be uniformly cast separately of similar or dissimilar materials and then joined or attached to one another as required.

Operation—Simplest Embodiment

The operation of the present invention takes advantage of the addition of the dome 12 to a bracket 10 placed over a miter joint J. The user simply positions the bracket 10 on the frame F so the apertures 123 straddle the miter joint J so that both fasteners 14 going through the apertures 123 will enter the frame F an equal distance on either side of the miter joint J. The user then places fasteners 14 through the apertures 123 and hammers or screws the fastener 14 all the way into the frame F. For brackets 10 having the depressed or counter-sunk dome roof 121, the user hammers or screws the fastener 14 all the way into the frame F so that the top of the fastener 14 is flush with the flat dome roof 121. While nails or screws are both appropriate for use as fasteners 14, the action of screws on the frame F take advantage of the cavity under the dome 12 to provide a tighter more secure joint J. Once the frame F is flush against the underside of the base plate 11, the user continues to tighten the fasteners 14; the screwing action of the fasteners 14 draws the upper edges of the miter joint J into the cavity beneath the dome roof 121 causing them to split slightly apart. At the same time, the screwing action of the fasteners 14 will press the lower edges of the miter joint J closer together for a tighter and more attractive joint J on the other side of the frame F.

Referring back to FIG. 2, the simplest embodiment of the present invention has no side flanges 13. Because this embodiment has no side flanges 13 and an oblate-hexagonal shape, the user is not restricted to positioning the bracket 10 along the edge of the frame or shutter to which it is attached.

Instead, the user is free to position this embodiment of the bracket 10 anywhere along the length of the miter joint as long as the bracket 10 straddles the miter. This gives the user much more flexibility in determining the optimal placement of the bracket 10 for functional as well as aesthetic considerations. The user is no longer restricted to placing the bracket 10 at the inner or outer corners. Further, the user is no longer restricted to aligning or placing the legs 114 of the bracket 10 directly over and along the edge of the frame F to which the bracket 10 is attached. Finally, the oblate-hexagonal shape of the base plate 11 substantially reduces the amount of material necessary to fabricate the bracket 10 which drives down the manufacturing costs and results in savings which can be passed on to the user, thereby providing yet another advantage of this embodiment.

Description—Alternative Embodiments with Stabilizing Flange(s)

Figure 3:
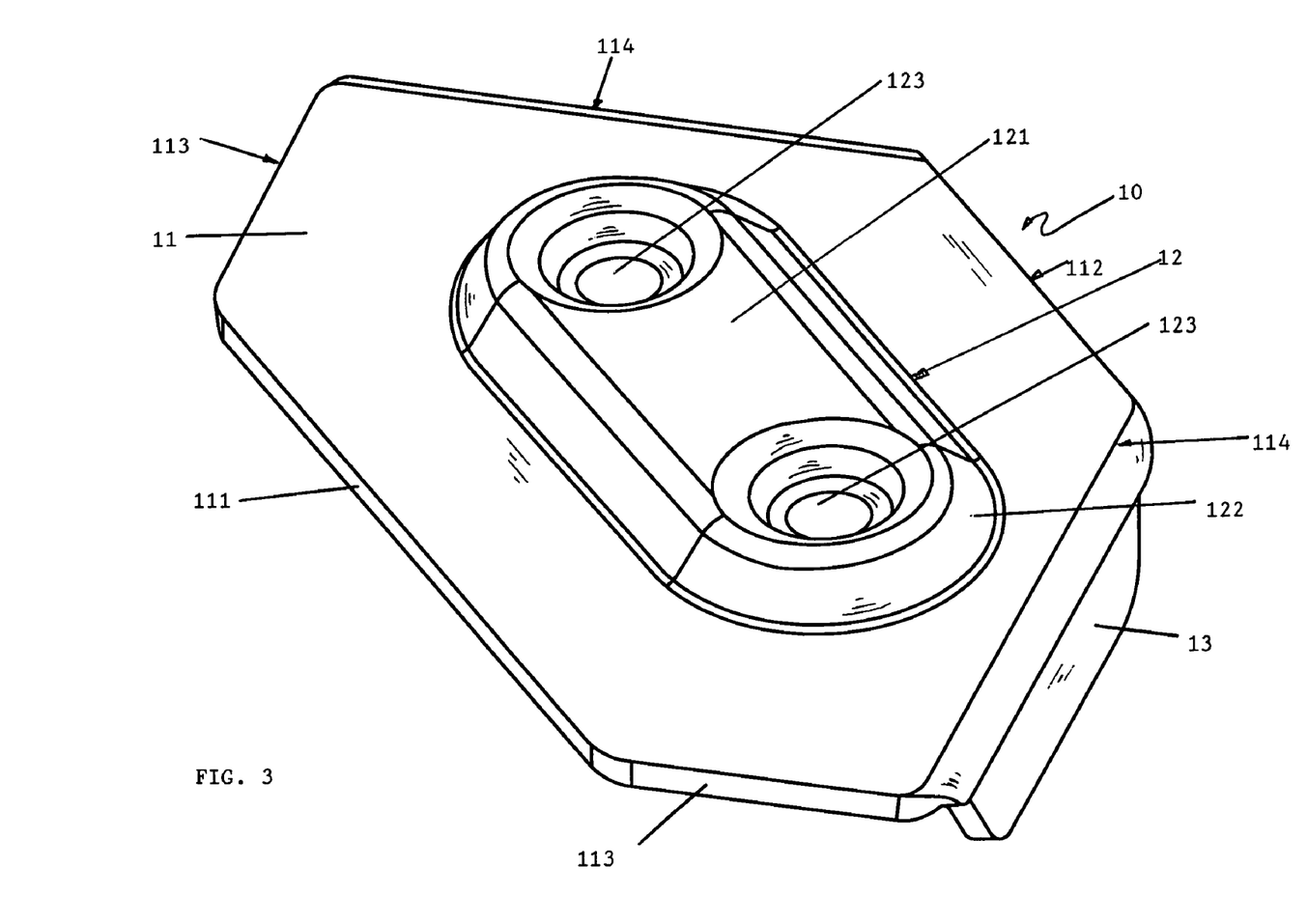
FIG. 3 is a downward-looking rear perspective of the present invention with a side-flap extending downward on one side.
Figure 3A:
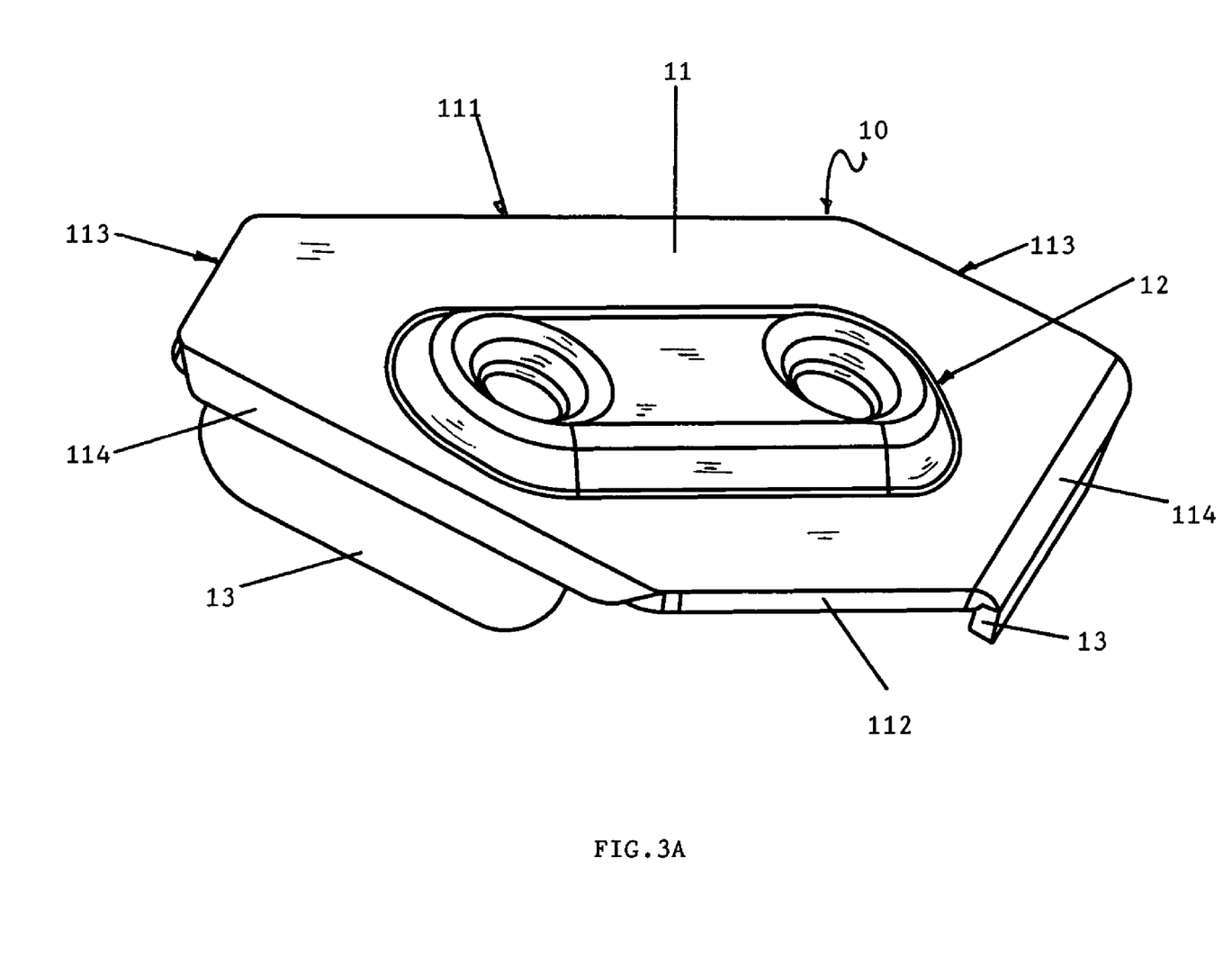
FIG. 3A is a downward-looking front perspective of the present invention with a side-flap extending downward on both sides.
Figure 4:
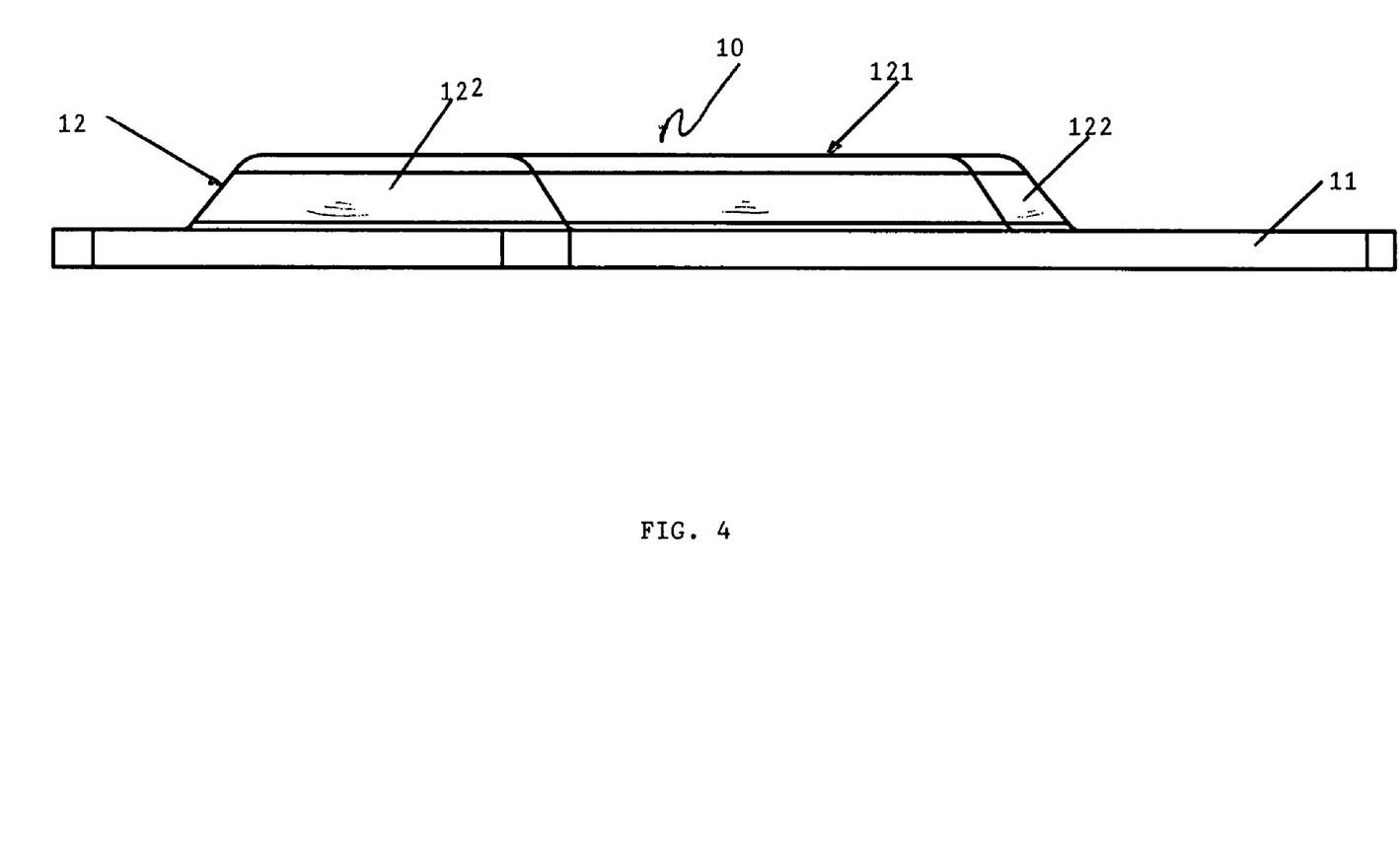
FIG. 4 is a side elevation view of the simplest embodiment of the present invention.
Figure 4A:
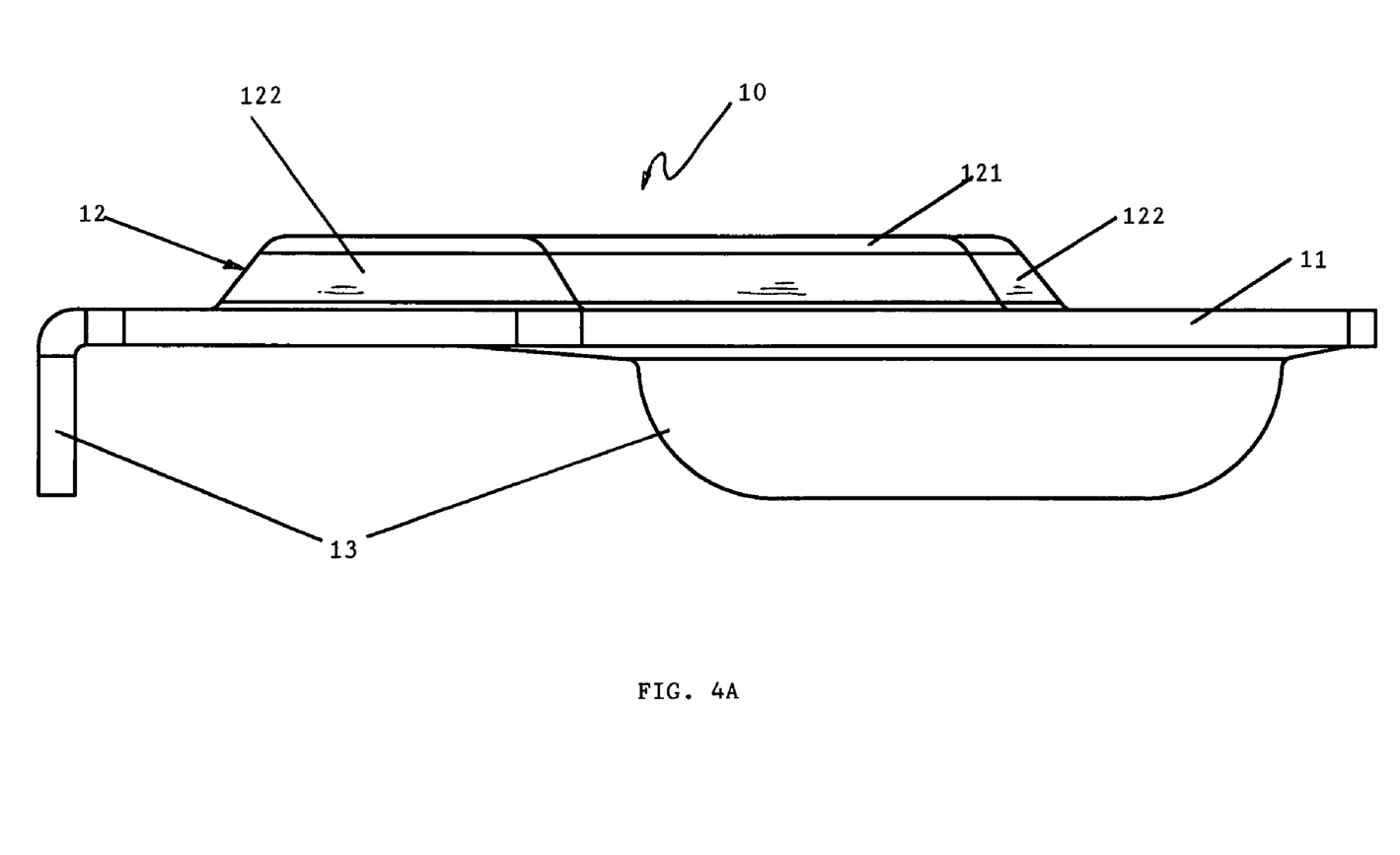
FIG. 4A is a side elevation view of the present invention with a side-flap extending downward on both sides.
Figure 5:
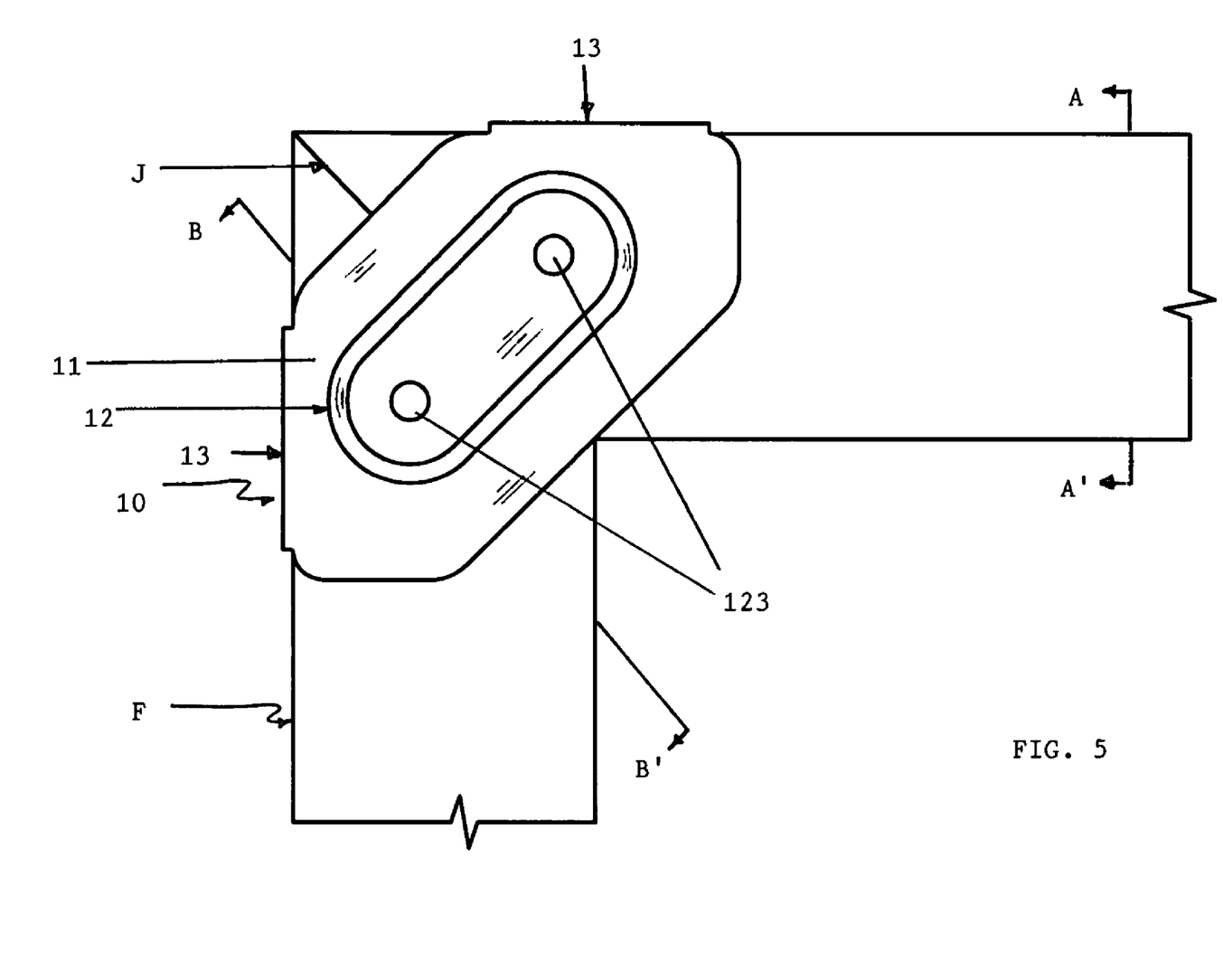
FIG. 5 is a plan view of the present invention mounted on a generic frame.
Figure 6:
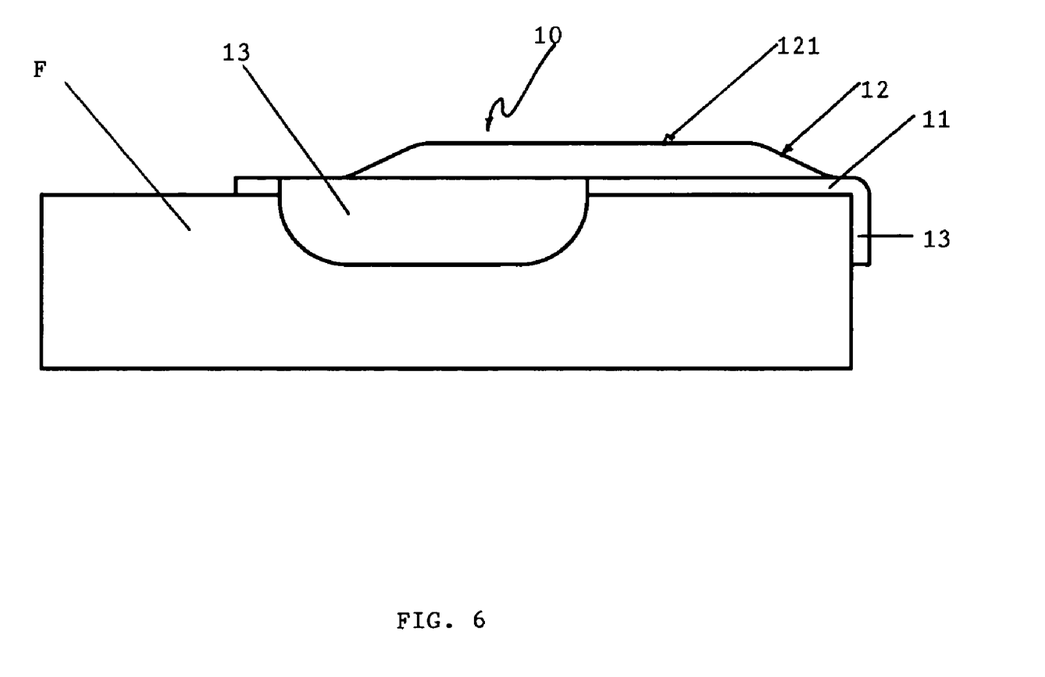
FIG. 6 is a side elevation view of the present invention with a side-flap extending downward on two sides and mounted on a generic frame.

Referring to FIGS. 3, 3A, 4A, 5, 6, 7, 9 10, and 11, the alternative embodiments are comprised of the same oblate hexagonal base-plate 11 and raised dome 12 found in the simplest embodiment. The alternative embodiments will also have one or two side-flanges 13 extending vertically downward at a right angle from the base plate 11 and one or both upper leg(s) 114. FIGS. 3 and 7 show the alternative embodiment with one side-flange 13 extending vertically downward at a right angle to the base-plate 11 and one upper leg 114 while FIGS. 3A, 4A, 5, 6, 9, 10, and 11 show the preferred embodiment which has two side-flanges 13 extending vertically downward at a right angles to the base-plate 11 and both upper legs 114. The side flanges 13 provide an extra measure of stability to the frame and bracket 10 configuration by further preventing the sides of the frame from wobbling.

Operation—Alternative Embodiments with Stabilizing Flange(s)

The operation of the embodiments with the stabilizing flanges 13 is similar to that of the simplest embodiment with the exception that the bracket 10 is positioned on the frame F so that the flange(s) 13 is (are) flush against the side(s) of the frame F to which the bracket 10 is attached. For the single-flange 13 alternative, the user slides the flange 13 along the side of the frame F until the apertures 123 straddle the miter joint J and fasteners 14 inserted through the apertures 123 will enter the surface of the frame F equidistant from the miter joint J. For the two-flange 13 alternative, the user simple slides both flanges 13 along the adjacent sides of the frame F moving away from the outer corner until the bracket 10 cannot move any farther away from the outer corner.

The user then places fasteners 14 through the apertures 123 and hammers or screws the fastener 14 all the way into the frame F. For brackets 10 having the depressed or counter-sunk dome roof 121, the user hammers or screws the fastener 14 all the way into the frame F so that the top of the fastener 14 is flush with the flat dome roof 121. While nails or screws are both appropriate for use as fasteners 14, the action of screws on the frame F take advantage of the cavity under the dome 12 to provide a tighter more secure joint J. Once the frame F is flush against the underside of the base plate 11, the user continues to tighten the fasteners 14; the screwing action of the fasteners 14 draws the upper edges of the miter joint J into the cavity beneath the dome roof 121 causing them to split slightly apart. At the same time, the screwing action of the fasteners 14 will press the lower edges of the miter joint J closer together for a tighter and more attractive joint J on the other side of the frame F.

Conclusions, Ramifications, and Scope

The foregoing paragraphs describe an invention that has successively overcome the shortcomings experienced by practitioners of the prior art. The present invention provides the consumer with a simple device and method of securing the adjacent sides of a frame, window, door, shutter, or other such structure configured with a miter joint. The present invention will be easy and economical to manufacture which translates to lower costs to the consuming public. The present invention is easy to install making it a "must-have" item for general contractors, carpenters, and window/shutter installers. In short, the present invention has built upon the contributions provided by the prior art and filled in the gaps with an innovative solution that gives the consumer an economical miter joint bracket that provides a tighter miter joint that is more secure and more attractive than the miter joint serviced by the devices disclosed by the prior art.

SUMMARY

The present invention has overcome the shortcomings inherent in the prior art by providing an improved miter joint bracket and a method of using this improved miter joint bracket efficiently and economically. The present invention overcomes each of the aforementioned shortcomings found in the prior art disclosures by:

(1) providing a miter joint bracket that will overcome the shortcoming of the prior art devices.

(2) providing a miter joint bracket that is simple to manufacture, economical in price and easy to use.

(3) providing a miter joint bracket that has no moving parts.

(4) providing a miter joint bracket that is simple in design, easy and inexpensive to manufacture, easy and safe to use, and commercially reasonable in price.

(5) providing a miter joint bracket that stabilizes the frame to which it is attached so as to prevent the frame from wobbling or breaking apart.

(6) providing a miter joint bracket that further tightens the edges of the miter joint against one another and thereby providing the user with a more solid, stable, and unmovable finished frame.

What is claimed is:

1. A miter-joint bracket comprising:
   a. a uniformly-cast oblate-hexagonal base plate, said base plate having:
      (1) a bottom side,
      (2) a top side parallel to and shorter in length than said bottom side,
      (3) two lower legs each adjacent to and extending outwardly at an obtuse angle from said bottom side,
      (4) two upper legs each adjacent to and extending inwardly from one or the other of said lower legs at an acute angle so as to intersect said top side and, if extended, intersect each other at a ninety-degree angle,
      (5) a hole in the center of said base plate; and
   b. a uniformly cast truncated hollow dome centered on said base plate over said hole and rising upward from said hole's edge and said base plate, said dome having a flat dome roof parallel to said base plate, said dome roof having two apertures positioned so that a line connecting said apertures would be parallel to said bottom side and said top side.

2. The device according to claim 1 further comprising a uniformly cast side flange extending downward from and perpendicular to said base plate along one of said upper legs.

3. The device according to claim 2 wherein said base plate, said dome, and said side flange are comprised of the same material.

4. The device according to claim 1 further comprising two uniformly cast side flanges extending downward from and perpendicular to said base plate along both of said upper legs.

5. The device according to claim 4 wherein said base plate, said dome, and said side flange are comprised of the same material.

6. The device according to claim 1 wherein said base plate and said dome are comprised of the same material.

7. A method of using a miter joint bracket as described in claim 1 comprising the steps of:
   a. Positioning said miter joint bracket over a miter joint on a frame so that said apertures straddle said miter joint and any fasteners inserted through said apertures would enter said frame on either side of said mater joint and equidistant therefrom;
   b. Inserting two screw-type fasteners through said apertures; and
   c. Screwing said fasteners into said frame until said frame's upper edges are moved apart and drawn upward through said hole in said base plate and into said cavity beneath said dome roof.

8. The method, according to claim 7, of using a miter joint bracket as described in claim 2 comprising the additional step of placing said side flange along said frame's side while positioning said bracket over said miter joint.

9. The method, according to claim 7, of using a miter joint bracket as described in claim 4 comprising the additional step of placing said side flanges along said frame's sides while positioning said bracket over said miter joint.

* * * * *